Aug. 23, 1960    J. D. HAYES ET AL    2,949,821
OBJECTIVE LENS
Filed April 25, 1958

FIG. 1

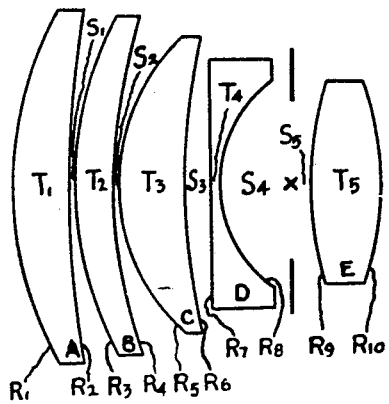

FIG. 2
EXAMPLE I

| LENS | CURVATURES | THICK. | SPACE. | nD | ν |
|---|---|---|---|---|---|
| A | $R_1 = 94.30$ <br> $R_2 = 282.38$ | $T_1 = 15.15$ | $S_1 = 0.38$ | 1.620 | 60.3 |
| B | $R_3 = 92.92$ <br> $R_4 = 135.38$ | $T_2 = 10.53$ | $S_2 = 0.38$ | 1.657 | 57.2 |
| C | $R_5 = 50.61$ <br> $R_6 = 166.92$ | $T_3 = 17.76$ | $S_3 = 6.76$ | 1.638 | 55.5 |
| D | $R_7 = \infty$ <br> $R_8 = 33.07$ | $T_4 = 2.69$ | $S_4 = 17.92$ | 1.7506 | 27.8 |
| E | $R_9 = 92.23$ <br> $R_{10} = -75.38$ | $T_5 = 18.76$ | $S_5 = 4.61$ | 1.670 | 47.2 |

E.F. = 100    B.F. = 40.62    f/1.1    F.A. = 30°

FIG. 3
EXAMPLE II

| LENS | CURVATURES | THICK | SPACE | nD | ν |
|---|---|---|---|---|---|
| A | $R_1 = 91.47$ <br> $R_2 = 281.95$ | $T_1 = 15.13$ | $S_1 = 0.38$ | 1.620 | 60.3 |
| B | $R_3 = 86.40$ <br> $R_4 = 125.96$ | $T_2 = 10.52$ | $S_2 = 0.38$ | 1.611 | 58.8 |
| C | $R_5 = 50.53$ <br> $R_6 = 166.66$ | $T_3 = 19.27$ | $S_3 = 5.22$ | 1.638 | 55.5 |
| D | $R_7 = \infty$ <br> $R_8 = 33.02$ | $T_4 = 2.68$ | $S_4 = 17.90$ | 1.7506 | 27.8 |
| E | $R_9 = 92.08$ <br> $R_{10} = -78.34$ | $T_5 = 18.74$ | $S_5 = 4.60$ | 1.670 | 47.2 |

E.F. = 100    B.F. = 39.56    f/1.1    F.A. = 30°

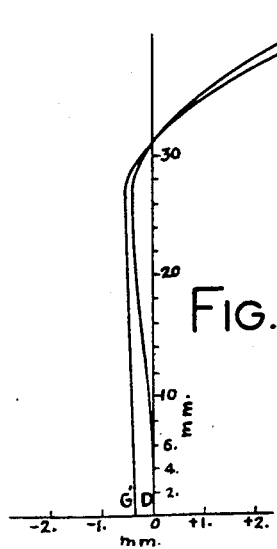

FIG. 4

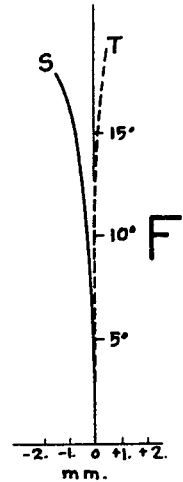

FIG. 5

INVENTORS
JOHN D. HAYES
LENA M. HUDSON
BY *[signature]*
ATTORNEY

United States Patent Office 2,949,821
Patented Aug. 23, 1960

2,949,821

OBJECTIVE LENS

John D. Hayes, Rochester, and Lena M. Hudson, Brighton, N.Y., assignors to Bausch & Lomb Optical Company, Rochester, N.Y., a corporation of New York Filed Apr. 25, 1958, Ser. No. 730,909

3 Claims. (Cl. 88—57)

This invention relates to photographic and television lens systems and the like having large relative apertures and moderate angular fields and it particularly relates to improvements in those optical objectives which are usually classified as modified triplets.

Such photographic objectives having the positive-negative-positive construction herein disclosed comprise a front positive lens group which consists of three single air-spaced meniscus lenses, each of which has positive power. Comparatively large relative apertures at least as great as $f/.1.1$ may be obtained in the triplet type of objectives in this way while maintaining a high quality of image aberrations such as spherical and chromatic aberrations, astigmatism, coma, sine condition, distortion and field curvature.

It is an object of this invention to provide a photographic objective or the like of the above-described form having a large relative aperture and a high degree of correction of all the above-mentioned image aberrations and further provide an objective which may be manufactured by the most economical procedures and processes. Further objects and advantages will be apparent by reference to the following specification and the accompanying drawing, wherein:

Fig. 1 is a diagrammatic view of a preferred form of our invention;

Figs. 2 and 3 are tables of numerical constructional data describing Examples I and II, respectively, which are two successful forms of our invention;

Fig. 4 is a graphical representation of the residual spherical aberration for image rays in the D and G' portion of the spectrum as related to the form of lens system shown in Example I of Fig. 2, and Fig. 5 is a graphical representation of the sagittal and tangential astigmatism designated by S and T, respectively, and related to Example I of Fig. 2.

With reference to Fig. 1 of the drawing, the preferred lens system comprises a group of three single air-spaced meniscus lenses A, B and C of positive power in optical alignment with each other and located on the long conjugate or front side of said system, said lenses all being convex toward the front. Spaced rearwardly thereof is a single plano-concave lens D of negative power which is coaxially aligned between the group of lenses A, B and C on the front side and an air-spaced double convex single lens E on the rear side. In the space between lenses D and E, a diaphragm is located.

According to our invention, the purpose of the aforesaid group of positive meniscus lenses A, B and C is to provide an abnormally large relative aperture of at least $f/1.1$ for said system and this result is achieved by determining the most advantageous ratio of the power of each such lens to the other lenses in the group and by determining the best ratios of power of lenses D and E to the sum of the individual collective powers of lenses A, B and C of said group. In accordance with our computations and experiments, the best values for the power of the individual lenses A, B, C, D and E for one successful form of our invention was determined to be as stated herebelow for Example I:

Lens: Power (diopters)
A ............................................. +4.514
B ............................................. +2.344
C ............................................. +9.306
D ............................................. −22.697
E ............................................. +15.427

The corresponding powers of the lenses A to E inclusive as found in a second successful form of our invention for Example II are as stated herebelow:

Lens: Power (diopters)
A ............................................. +4.7183
B ............................................. +2.4449
C ............................................. +9.3666
D ............................................. −22.7316
E ............................................. +15.1303

The aforementioned ratio between the stated powers of the A, B and C lenses within said lens group in Example I are:

$$\frac{P_A}{P_B}=1.9300 \text{ and } \frac{P_C}{P_A}=2.062$$

where P denotes the power of the lens. The corresponding ratios between the stated powers of the A, B and C lenses in Example II are:

$$\frac{P_A}{P_B}=1.9296 \text{ and } \frac{P_C}{P_A}=1.9853$$

Furthermore, our computations and experimentation on the present invention show that the best ratio of the sum of the powers $(P_A+P_B+P_C)$ of the lenses A, B and C to the powers ($P_D$ or $P_E$) of the D and E lenses individually is according to the numerical values given herebelow:

For Example I—

$P_D=1.4041 \ (P_A+P_B+P_C)$
$P_E=.9544 \ (P_A+P_B+P_C)$

For Example II—

$P_D=1.3752 \ (P_A+P_B+P_C)$
$P_E=.9153 \ (P_A+P_B+P_C)$

In general, we have produced superior objectives of the above-described type by choosing constructional and performance data within the limiting values stated herebelow:

$\frac{P_A}{P_B}=1.9$ to $2.0$ $\frac{P_C}{P_A}=1.95$ to $2.08$ $P_D=1.35$ to $1.45 \ (P_A+P_B+P_C)$
$P_E=.90$ to $.98 \ (P_A+P_B+P_C)$
$n_D$ for D lens=1.7200 to 1.7650
$\nu$ for D lens=26.0 to 30.0
$S_3=6.0$ to $10.0 \ (S_1+S_2)$
$S_4+S_5=2.5$ to $4.0 \ (S_1+S_2+S_3)$ wherein $n_D$ denotes the refractive index of the glass for the D line of the spectrum, $\nu$ denotes the dispersion or Abbe number of the glass, $S_1$ to $S_5$ inclusive denote the air spaces between the individual lenses, A, B, C, D and E, numbering from the front.

When triplet objectives are constructed according to the above specified limitations, it is not only possible to obtain the aforesaid large relative aperture but the correction of image aberrations is also excellent. This fact is particularly well evidenced by reference to the graphs shown in Figs. 4 and 5 of the drawing. Curves D and G' of Fig. 4 show the superior correction of the spherical aberrations for light in the D and G' portion of the visible spectrum within a moderate angular field of 30°. The solid line curve S and the dotted line curve T of Fig. 5 representing the sagittal and tangential astigmatism, respectively, for the same angular field further show the excellent performance qualities of the above described objective.

Two specific examples numbered I and II of our invention are shown in Figs. 2 and 3, respectively, in the drawings and the constructional data therefor is duplicated herebelow:

Example I

[E.F.=100  B.F.=40.62  f/1.1  F.A.=30°.]

| Lens | Curvatures | Thickness | Spaces | $n_D$ | $\nu$ |
|---|---|---|---|---|---|
| A | $R_1 = 94.30$ | $T_1 = 15.15$ | | 1.6200 | 60.3 |
|   | $R_2 = 282.38$ | | $S_1 = 0.38$ | | |
| B | $R_3 = 92.92$ | $T_2 = 10.53$ | | 1.6570 | 57.2 |
|   | $R_4 = 135.38$ | | $S_2 = 0.38$ | | |
| C | $R_5 = 50.61$ | $T_3 = 17.76$ | | 1.6380 | 55.5 |
|   | $R_6 = 166.92$ | | $S_3 = 6.76$ | | |
| D | $R_7 = \infty$ | $T_4 = 2.69$ | | 1.7506 | 27.8 |
|   | $R_8 = 33.07$ | | $S_4 = 17.92$ $S_5 = 4.61$ | | |
| E | $R_9 = 92.23$ | $T_5 = 18.76$ | | 1.6700 | 47.2 |
|   | $R_{10} = -75.38$ | | | | |

Example II

[E.F.=100  B.F.=39.56  f/1.1  F.A.=30°.]

| Lens | Curvatures | Thickness | Spaces | $n_D$ | $\nu$ |
|---|---|---|---|---|---|
| A | $R_1 = 91.47$ | $T_1 = 15.13$ | | 1.6200 | 60.3 |
|   | $R_2 = 281.95$ | | $S_1 = 0.38$ | | |
| B | $R_3 = 86.40$ | $T_2 = 10.52$ | | 1.6110 | 58.8 |
|   | $R_4 = 125.96$ | | $S_2 = 0.38$ | | |
| C | $R_5 = 50.53$ | $T_3 = 19.27$ | | 1.6380 | 55.5 |
|   | $R_6 = 166.66$ | | $S_3 = 5.22$ | | |
| D | $R_7 = \infty$ | $T_4 = 2.68$ | | 1.7506 | 27.8 |
|   | $R_8 = 33.02$ | | $S_4 = 17.90$ $S_5 = 4.60$ | | |
| E | $R_9 = 92.08$ | $T_5 = 18.74$ | | 1.6700 | 47.2 |
|   | $R_{10} = -78.34$ | | | | | wherein A, B, C, D and E designate the individual lenses, $R_1$ to $R_{10}$ inclusive designate the lens curvatures, $T_1$ to $T_5$ inclusive designate the lens thicknesses, $S_1$ to $S_5$ inclusive designate the air spaces between the lenses, all of which are numbered from the front, $n_D$ denotes the refractive index for the D line of the spectrum of the glass from which the lenses are made, and $\nu$ denotes the dispersion or Abbe number for said glass.

Although only two embodiments of our invention have been shown and described in detail, it will be understood that other embodiments may be constructed within the constructional limits hereinbefore stated. In all forms of this invention, only single lenses are provided having mostly low curvatures and moderate thickness and said lenses being made from easily obtainable glasses so as to provide at very low cost a lens system having relative apertures at least as great as f/1.1 and having superior correction for the aforementioned image aberrations, all of which is in accordance with the objects of this invention.

We claim:
1. A lens system of the kind described which is corrected for spherical and chromatic aberrations, astigmatism, coma, sine condition, distortion and field curvature and consists of five single air-spaced lenses which are optically aligned with each other, the first three lenses on the long conjugate side of said system being collective meniscus lenses, the fourth lens being a dispersive lens, and the rearmost lens being a collective lens, the refractive curvatures of said lenses being given by the following mathematical expressions in which $R_1$ to $R_{10}$ represent said curvatures numbered from the front toward the rear of the system and F represents the equivalent focus of said system;

$$0.9\,F < R_1 < 1.0\,F$$
$$2.7\,F < R_2 < 3.0\,F$$
$$0.8\,F < R_3 < 1.0\,F$$
$$1.1\,F < R_4 < 1.5\,F$$
$$.45\,F < R_5 < .55\,F$$
$$1.5\,F < R_6 < 1.7\,F$$
$$R_7 > 2.0\,F$$
$$.3\,F < R_8 < .4\,F$$
$$.8\,F < R_9 < 1.0\,F$$
$$.7\,F < R_{10} < .9\,F$$

the axial lens thicknesses being given by the following mathematical expressions wherein $T_1$ to $T_5$ represent said thicknesses numbered from the front toward the rear of the system;

$$.15\,F < T_1 < .16\,F$$
$$.10\,F < T_2 < .11\,F$$
$$.17\,F < T_3 < .20\,F$$
$$.02\,F < T_4 < .03\,F$$
$$.17\,F < T_5 < .20\,F$$

the air spaces between said components being given by the following mathematical expressions and being designated by the letters $S_1$ to $S_5$ numbering from the front toward the rear of said system;

$$.003\,F < S_1 < .005\,F$$
$$.003\,F < S_2 < .005\,F$$
$$.04\,F < S_3 < .08\,F$$
$$.16\,F < S_4 < .19\,F$$
$$.04\,F < S_5 < .05\,F$$

2. A photographic objective corrected for spherical and chromatic aberrations, astigmatism, coma, sine condition, distortion and field curvature consisting of five air-spaced single lenses in optical alignment with each other and constructed according to the constructional data given herebelow:

[E.F.=100  B.F.=40.62  f/1.1  F.A.=30°.]

| Lens | Curvatures | Thickness | Spaces | $n_D$ | $\nu$ |
|---|---|---|---|---|---|
| A | $R_1 = 94.30$ | $T_1 = 15.15$ | | 1.6200 | 60.3 |
|   | $R_2 = 282.38$ | | $S_1 = 0.38$ | | |
| B | $R_3 = 92.92$ | $T_2 = 10.53$ | | 1.6570 | 57.2 |
|   | $R_4 = 135.38$ | | $S_2 = 0.38$ | | |
| C | $R_5 = 50.61$ | $T_3 = 17.76$ | | 1.6380 | 55.5 |
|   | $R_6 = 166.92$ | | $S_3 = 6.76$ | | |
| D | $R_7 = \infty$ | $T_4 = 2.69$ | | 1.7506 | 27.8 |
|   | $R_8 = 33.07$ | | $S_4 = 17.92$ $S_5 = 4.61$ | | |
| E | $R_9 = 92.23$ | $T_5 = 18.76$ | | 1.6700 | 47.2 |
|   | $R_{10} = -75.38$ | | | | | wherein $R_1$ to $R_{10}$ inclusive designate the lens curvatures, $T_1$ to $T_5$ inclusive designate the lens thicknesses, $S_1$ to $S_5$ inclusive designate the spaces between the lenses, $n_D$ designates the refractive index of the glass for the D line of the spectrum for the respective lenses and $\nu$ designates the Abbe number of said lenses numbering from the front to the rear of said system.

3. A photographic objective corrected for spherical and chromatic aberrations, astigmatism, coma, sine condition, distortion and field curvature consisting of five air-spaced single lenses in optical alignment with each other and constructed according to the constructional data given herebelow:

[E.F.=100  B.F.=39.56  $f/1.1$  F.A.=30°.]

| Lens | Curvatures | Thickness | Spaces | $n_D$ | $\nu$ |
|---|---|---|---|---|---|
| A | $R_1 = 91.47$ | $T_1 = 15.13$ | | 1.6200 | 60.3 |
| | $R_2 = 281.95$ | | $S_1 = 0.38$ | | |
| B | $R_3 = 86.40$ | $T_2 = 10.52$ | | 1.6110 | 58.8 |
| | $R_4 = 125.96$ | | $S_2 = 0.38$ | | |
| C | $R_5 = 50.53$ | $T_3 = 19.27$ | | 1.6380 | 55.5 |
| | $R_6 = 166.66$ | | $S_3 = 5.22$ | | |
| D | $R_7 = \infty$ | $T_4 = 2.68$ | | 1.7506 | 27.8 |
| | $R_8 = 33.02$ | | $S_4 = 17.90$ $S_5 = 4.60$ | | |
| E | $R_9 = 92.08$ | $T_5 = 18.74$ | | 1.6700 | 47.2 |
| | $R_{10} = -78.34$ | | | | | wherein $R_1$ to $R_{10}$ inclusive designate the lens curvatures, $T_1$ to $T_5$ inclusive designate the lens thicknesses, $S_1$ to $S_5$ inclusive designate the spaces between the lenses, $n_D$ designates the refractive index of the glass for the D line of the spectrum for the respective lenses and $\nu$ designates the Abbe number of said lenses numbering from the front to the rear of said system.

References Cited in the file of this patent

UNITED STATES PATENTS

| | | |
|---|---|---|
| 1,540,752 | Bielicke | June 9, 1925 |
| 2,346,061 | Altman | Apr. 4, 1944 |
| 2,576,436 | Baker | Nov. 27, 1951 |
| 2,586,866 | Schade | Feb. 26, 1952 |
| 2,767,614 | Altman | Oct. 23, 1956 |
| 2,821,112 | Lautenbacher et al. | Jan. 28, 1958 |
| 2,861,500 | Tronnier | Nov. 25, 1958 |

FOREIGN PATENTS

| | | |
|---|---|---|
| 428,657 | Germany | May 10, 1926 |

UNITED STATES PATENT OFFICE

CERTIFICATE OF CORRECTION

Patent No. 2,949,821                        August 23, 1960

John D. Hayes et al.

It is hereby certified that error appears in the printed specification of the above numbered patent requiring correction and that the said Letters Patent should read as corrected below.

Column 1, line 25, for "f/.1.1" read -- f/1.1 --.

Signed and sealed this 4th day of April 1961.

(SEAL)
Attest: ERNEST W. SWIDER

Attesting Officer

ARTHUR W. CROCKER
Acting Commissioner of Patents